(12) United States Patent
Pai

(10) Patent No.: US 7,058,931 B2
(45) Date of Patent: Jun. 6, 2006

(54) DYNAMICALLY CONFIGURABLE UNIT CONVERSION MECHANISM

(75) Inventor: Vinay S. Pai, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 598 days.

(21) Appl. No.: 10/267,945

(22) Filed: Oct. 8, 2002

(65) Prior Publication Data

US 2004/0068529 A1    Apr. 8, 2004

(51) Int. Cl.
G06F 9/45 (2006.01)
(52) U.S. Cl. ............................ 717/137; 717/136
(58) Field of Classification Search ........ 717/168–178, 717/136, 137; 708/206; 707/100–102; 715/331; 709/231, 224
See application file for complete search history.

(56) References Cited

U.S. PATENT DOCUMENTS

| | | | | |
|---|---|---|---|---|
| 6,460,046 | B1 * | 10/2002 | Meek | 707/102 |
| 6,658,625 | B1 * | 12/2003 | Allen | 715/523 |
| 2003/0158854 | A1 * | 8/2003 | Yoshida et al. | 707/101 |
| 2003/0217063 | A1 * | 11/2003 | Tomic et al. | 707/100 |
| 2003/0236791 | A1 * | 12/2003 | Wilmsen et al. | 707/100 |

* cited by examiner

Primary Examiner—Wei Zhen
Assistant Examiner—Mulubrhan T. Tecklu
(74) Attorney, Agent, or Firm—Hickman Palermo Truong & Becker LLP; Christopher J. Brokaw

(57) ABSTRACT

A method and apparatus for dynamically configuring a unit conversion mechanism is provided. A non-executable data structure defines information, which is accessed to facilitate unit conversion. The information in the non-executable data structure is in the form of elements, which include among other things at least one measurable quantity, such as length or mass, along with a plurality of units, such as feet, meters, millimeters, pounds, and kilograms. Each of the units is associated with a measurable quantity. For example, feet, meters, and millimeters are used in measuring length. Conversion information, which includes an offset and a gain, is associated with each of the units. The plurality of units, along with the conversion information, is used to dynamically configure the unit conversion mechanism at runtime. In so doing, the unit conversion mechanism can convert from one unit to another unit for a measurable quantity.

27 Claims, 9 Drawing Sheets

CONVERT METHOD 181C

```
public static double convert (double sourceVal, Unit sourceUnit, Unit destUnit) {
    double baseVal;

baseVal = (sourceVal - sourceUnit.get_myOffset() ) / sourceUnit.get_myGain();   ←310 return (baseVal * destUnit.get_myGain () ) + destUnit.get_myOffset();   ← 320
}
```

FIG. 1B

```
METADATA 110

<measurable_quantity>              111
    <name>length</name>            112
    <unit is_base="true">          113
        <name>meter</name>         114
        <gain>1.0</gain>           115
        <offset>0.0</offset>       116
    </unit>                        117
    <unit is_base="false">         118
        <name>foot</name>          119
        <gain>3.28</gain>          120
        <offset>0.0</offset>       121
    </unit>                        122
    <unit is_base="false">         123
        <name>millimeter</name>    124
        <gain>1000</gain>          125
        <offset>0.0</offset>       126
    </unit>                        127
</measurable_quantity>             128
<measurable_quantity>              129
    <name>mass</name>              130
    <unit is_base="true">          131
        <name>kilogram</name>      132
        <gain>1.0</gain>           133
        <offset>0.0</offset>       134
    </unit>                        135
    <unit is_base="false">         136
        <name>pound</name>         137
        <gain>2.2</gain>           138
        <offset>0.0</offset>       139
    </unit>                        140
</measurable_quantity>             141
```

CONVERT METHOD 181C

```
public static double convert (double sourceVal, Unit sourceUnit, Unit destUnit) {
    double baseVal;

baseVal = (sourceVal - sourceUnit.get_myOffset() ) / sourceUnit.get_myGain();    ~310 return (baseVal * destUnit.get_myGain () ) + destUnit.get_myOffset();    ~320
}
```

FIG. 3

DYNAMICALLY CONFIGURABLE UNIT CONVERSION MECHANISM

FIELD OF THE INVENTION

The present invention relates generally to computers and more specifically to a dynamically configurable unit conversion mechanism.

BACKGROUND

A problem that is frequently encountered in engineering software is converting data from one unit system to another unit system. If users desire to perform computations on data that is stored in the US system and display the results in the metric system, then the stored data must be converted from the US system to the metric system. For example, a user may need to determine how many meters are in 100 feet.

One approach to this problem is to hard code conversions into the engineering software. For example, the engineering software would have hard coded conversions from the US system to the metric system. However, since the conversions are hard coded, the engineering software is only useful in the countries that use the metric system. Furthermore, the engineering software is only useful for the units that are hard coded in the engineering software. For example, if conversions for only the meter unit and the foot unit are hard coded, then the engineering system can only convert between meters and feet. Therefore, the engineering software must be modified and recompiled for any change that is needed. It would be desirable if the engineering software could be used without modification and/or recompilation.

Another approach to this problem is a proprietary file format, which defines measurements. For example, the American Petroleum Institute defines many measurements. However, existing proprietary file formats do not provide a standard method of defining measurements or of performing unit conversions.

Based on the foregoing, it is desirable to provide an improved mechanism for performing unit conversions.

SUMMARY

In accordance with one embodiment of the present invention, there is provided a dynamically configurable unit conversion mechanism. According to one embodiment, a non-executable data structure defines information, which is accessed to facilitate unit conversion. According to one aspect, the information is in the form of elements, which include among other things at least one type of measurable_quantity (referred to hereinafter as "measurable quantity"), such as length or mass, along with a plurality of units, such as feet, meters, millimeters, pounds, and kilograms, and conversion information. Each of the units is associated with a measurable quantity. For example, feet, meters, and millimeters are used in measuring length; whereas pounds and kilograms are used for measuring mass. Conversion information, which includes an offset and a gain, is associated with each of the units. The plurality of units, along with the conversion information, is used to dynamically configure the unit conversion mechanism at runtime. In so doing, the unit conversion mechanism can convert from one unit to another unit for a particular measurable quantity.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1B depicts metadata, which is used for dynamically configuring the generic unit converter;

FIG. 3 is a block diagram depicting the convert method; and

DETAILED DESCRIPTION OF EMBODIMENT(S)

A dynamically configurable unit conversion mechanism is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

A System Overview

Figure 1A:
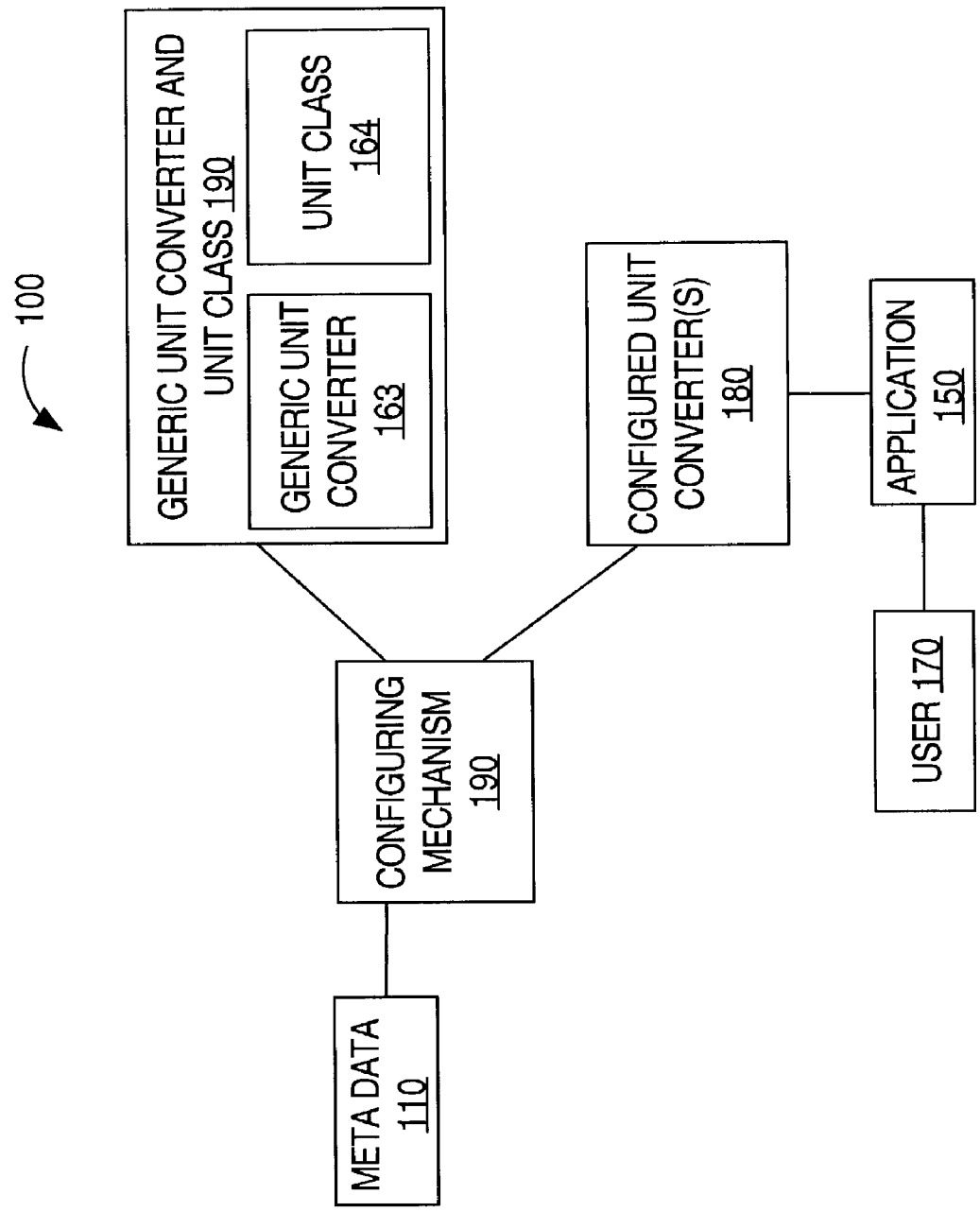
FIG. 1A is a block diagram of a system for dynamically configuring a generic unit converter.

FIG. 1A is a block diagram of a system for dynamically configuring a generic unit converter, according to one embodiment of the present invention. The system 100 comprises metadata 110, a configuring mechanism 190, a generic unit converter and unit class 160, dynamically configured unit converter(s) 180, an application 150 and a user 170.

When properly configured, the generic unit converter 163 is used at run time to create the configured unit converter(s) 180, which can be used to perform conversions from any unit to any other unit for a particular measurable_quantity (referred to hereinafter as "performing unit conversions"). For example, the metadata 110 defines a non-executable data structure comprised of information in the form of elements, such as at least one measurable quantity, a plurality of units, one or more sets of parameters, and conversion information. The configuring mechanism 190 reads and parses the metadata 110 to obtain the information. The configuring mechanism 190 has logic to determine which classes need to be instantiated and to determine how the resulting instances should be associated with each other to produce the configured unit converter(s) 180. For example, the configuring mechanism 190 uses the information in conjunction with the unit class 164 to dynamically configure the generic unit converter 163, as will be described in more detail. As a result of dynamically configuring the generic unit converter 163, the configured unit converter(s) 180 are produced.

An application 150 uses the configured unit converter(s) 180 to perform unit conversions, when for example, a user 170 requests to convert one unit, such as feet, to another unit, such as millimeters, for a particular measurable quantity, such as length.

The Metadata

FIG. 1B depicts metadata, which is used for dynamically configuring the generic unit converter, according to one embodiment of the present invention. As already stated, the metadata 110 defines a non-executable data structure comprised of information in the form of elements, such as at least one measurable quantity, a plurality of units, one or more sets of parameters, and conversion information. According to one embodiment, each measurable_quantity is associated with a plurality of units and the conversion information is associated with each of the units in order to perform unit conversions, as will be described in more detail.

Examples of measurable quantities are, among other things, length, volume, density, mass, temperature, speed, and liquid rate. Examples of units, which are associated with the length measurable quantity, among other things, are feet, meter, inch, and millimeter. Examples of units, which are associated with the volume measurable quantity, among other things, are gallons and liters. Examples of units, which are associated with the density measurable quantity, among other things, are pounds per gallon and grams per cubic centimeter. These examples are not intended to be an exhaustive list of all of the possible measurable quantities and units.

According to one embodiment, the metadata 110 is an Extensible Markup Language (XML) document. For example, the metadata 110, as depicted in FIG. 1B, comprises two measurable quantities—length (reference numbers 111 through 128) and mass (reference numbers 129 through 141). Furthermore, the length measurable quantity comprises three units—meter (reference numbers 113 through 117), foot (reference numbers 118 through 122), and millimeter (reference numbers 123 through 127). Whereas, the mass measurable_quantity comprises two units—kilogram (reference numbers 131 through 135) and pound (reference numbers 136 through 140).

A set of parameters comprises a plurality of units by which a type of quantity can be measured. Therefore as depicted in the metadata 110, there are two sets of parameters. The first set of parameters comprises the information (reference numbers 113 through 127) associated with the meter unit, the foot unit, and the millimeter unit. The second set of parameters comprises the information (reference numbers 130 through 140) associated with the kilogram unit and the pound unit.

The conversion information is associated with each unit in the form of a gain (reference numbers 115, 120, 125, 133, and 138), also known as a multiplier, and an offset (reference numbers 116, 121, 126, 134, and 139). For example, the meter unit has a gain of 1.0 (reference number 115) and an offset of 0.0 (reference number 116).

According to one embodiment, the metadata 110 indicates which unit is the base unit for a particular measurable quantity. For example, at reference number 113, the metadata 110 indicates that the meter unit is the base unit for the length measurable quantity. Likewise, at reference number 118, the metadata 110 indicates that the foot unit is not a base unit for the length measurable quantity.

According to one embodiment, the metadata 110 is a text file, which specifies a hierarchical structure. This hierarchical structure is used to determine, which units are associated with a particular measurable quantity. For example, since meter (reference number 113 through 117), foot (reference number 118 through 122), and millimeter (reference number 123 through 127) are positioned under the length measurable_quantity (reference number 111), these three units are associated with the length measurable quantity.

Techniques besides positioning units under measurable quantities may be used for associating units with measurable quantities. Examples of other techniques include but are not limited to tags, commands, entries in one or more tables, or instructions that list associations between a particular measurable_quantity and the corresponding units.

The information in metadata 110 may be validated and the format may be checked for consistency. Metadata as described herein also provides the ability to decouple the information in the metadata 110 from the code, which comprises among other things the configuring mechanism 190, the generic unit converter and unit class 160, and/or the application 150, as will be described in more detail herein.

The Generic Unit Converter and the Unit Class

Figure 1C:
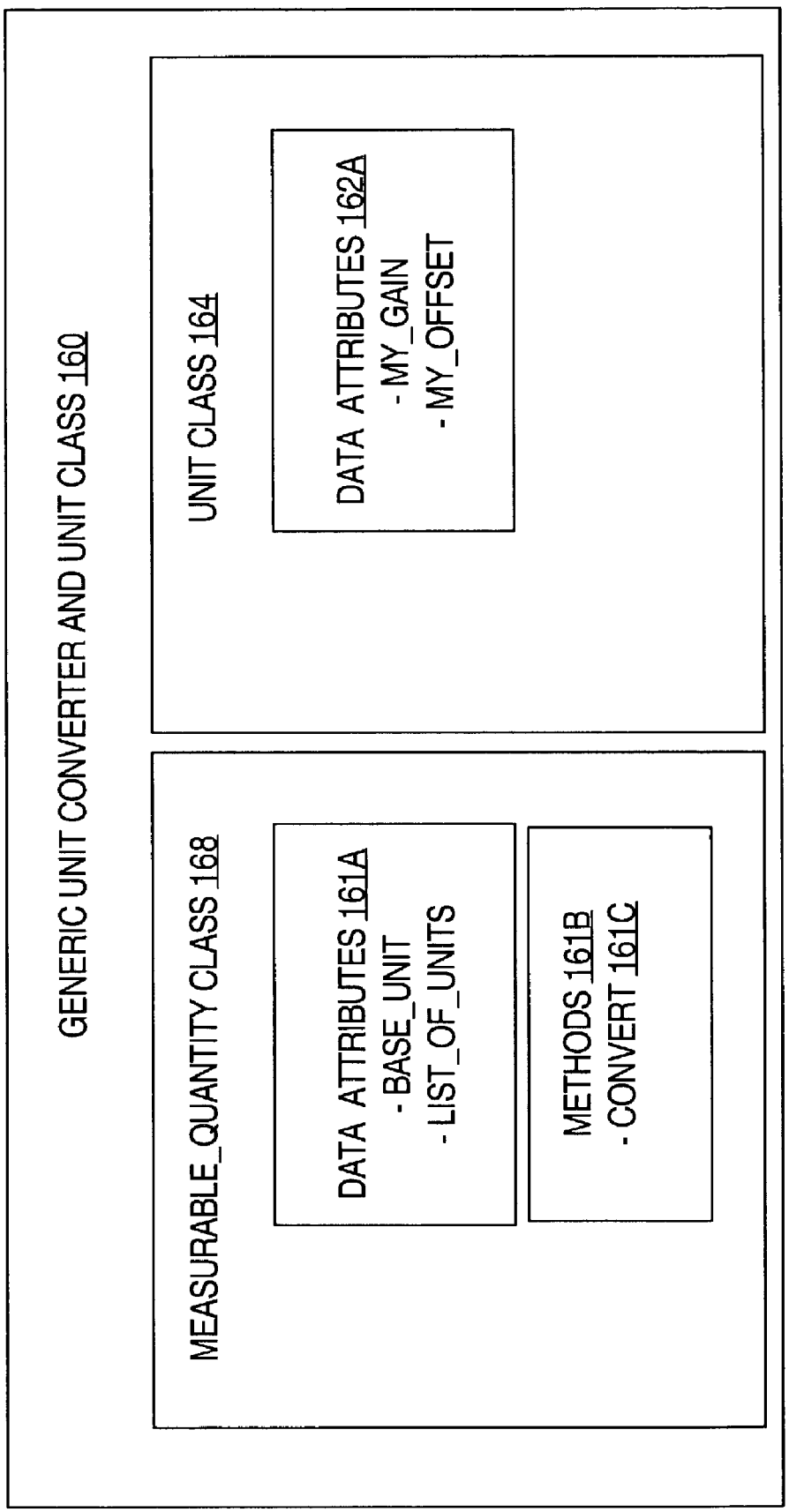
FIG. 1C is a block diagram of the generic unit converter and the unit class.

FIG. 1C is a block diagram of the generic unit converter and the unit class, according to one embodiment of the present invention. As depicted in FIG. 1C, the generic unit converter and unit class 160 comprises two classes, a measurable_quantity class 168 and a unit class 164. According to one embodiment, the measurable_quantity class 168 is the generic unit converter 163. In this case, generic unit converter 163 is dynamically configured by creating instances of the measurable_quantity class 168 and the unit class 164, and associating information from the metadata 110 with these instances, which results in the configured unit converter(s) 180, as will be described in more detail hereinafter. In so doing, a particular configured unit converter of the configured unit converter(s) 180 can be used to perform unit conversions from any unit associated with that particular configured unit converter to any other unit associated with that particular configured unit converter for the measurable_quantity associated with that particular configured unit converter, as will be described in more detail.

According to one embodiment, the measurable_quantity class 168 comprises two data attributes 161A, which are base_unit and list_of_units, and one method 161B, which is the convert method 161C. According to one embodiment, the base_unit in the measurable_quantity class 168 is optional. The convert method 161C has logic for performing unit conversions, as will be described in more detail herein. According to one embodiment, the unit class 164 comprises two data attributes 162A, which are my_gain and my_offset, that are used in the unit conversion process, as will be described in more detail. The measurable_quantity class 168 and the unit class 164 may include methods for accessing (not shown) their respective data attributes (161A, 162A).

The Configured Unit Converters

Figure 1D:
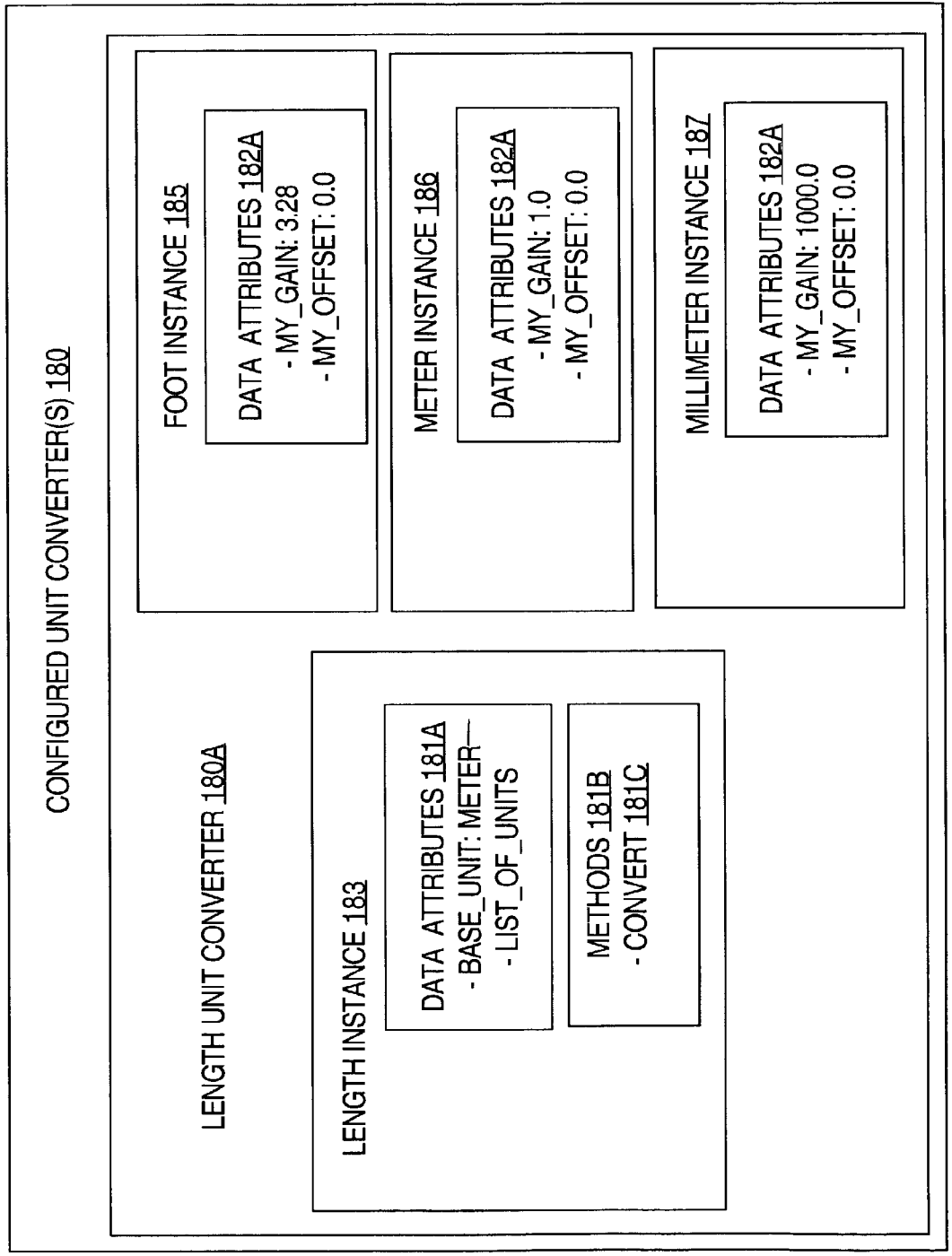
FIGS. 1D and 1E are block diagrams of the configured unit converters.
Figure 1E:
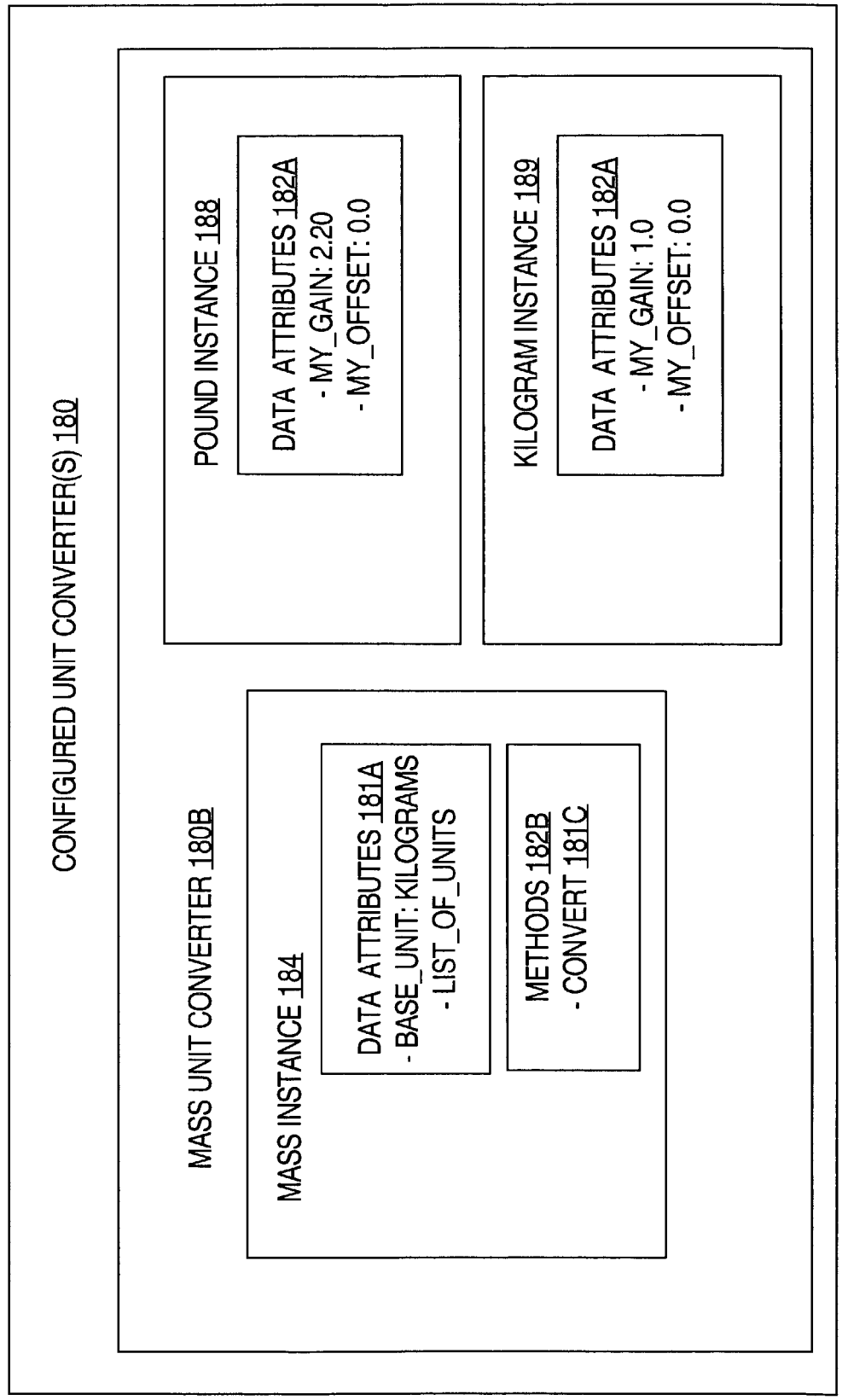

FIGS. 1D and 1E are block diagrams of the configured unit converters, according to one embodiment of the present invention. One aspect of dynamically configuring the generic unit converter 163 is the creation of the configured unit converter(s) 180. As depicted in FIGS. 1D and 1E, the configured unit converter(s) 180 comprises two configured unit converters, which are the length unit converter 180A and the mass unit converter 180B.

In object-oriented programming, classes define and are used to create instances. The classes are used to define the structure of the data, also known as data attributes, and methods, which access and manipulate the data. When an instance of a particular class is created, the instance can store data that conforms to the structure defined in the class and the methods in the instance can access and manipulate the stored data.

The configured unit converter(s) 180 include instances (183, 185, 186, 187, 184, 188, 189) of the classes (168, 164). For example, the length instance 183 and the mass instance 184 are instances of the measurable_quantity class 168 (referred to herein as "measurable instances"). Similarly, the foot instance 185, the meter instance 186, the millimeter instance 187, the pound instance 188, and kilogram instance 189 are instances of the unit class 184 (referred to herein as "unit instances").

When an instance (183, 185, 186, 187, 184, 188, 189) of a class (168, 164) is created, the instances (183, 185, 186, 187, 184, 188, 189) have the data attributes and the methods of the classes (168, 164) that were used to create the instances (183, 185, 186, 187, 184, 188, 189). For example, the data attributes 161A and the methods 161B of the measurable_quantity class 168 correspond to the data attributes 181A and methods 181B in the length instance 183. Therefore, the convert method 181C of the length instance 183 is derived from the convert method 161C of the measurable_quantity class 168. In so doing, the convert method 181C has the same logic as the convert method 161C and therefore, the convert method 181C is used for performing unit conversions, as will be described in more detail.

The generic unit converter 163 is dynamically configured when the measurable instances (183, 184) of the measurable_quantity class 168 are created, the unit instances (185, 186, 187, 188, 189) of the unit class 164 are created, these unit instances (185, 186, 187, 188, 189) are associated with their respective measurable instances (183, 184) via the list_of_units in data attributes 181A, and the data attributes 182A of the unit instances (185, 186, 187, 188, 189) are populated with conversion information (reference numbers 115, 116, 120, 125, 126, 133, 134, 137, 138, 139) from metadata 110, as will be described in more detail. In so doing, the length unit converter 180A and the mass unit converter 180B are created.

An Operational Example

Figure 2A:
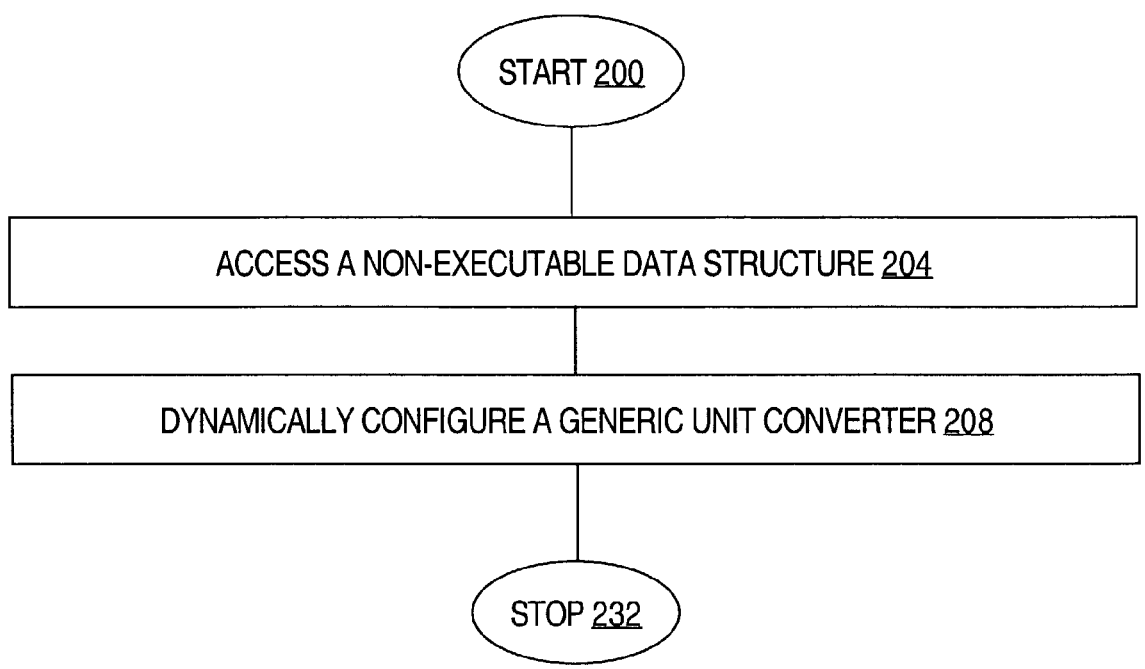
FIGS. 2A and 2B are flowcharts illustrating the operational flow for dynamically configuring the generic unit converter.
Figure 2B:
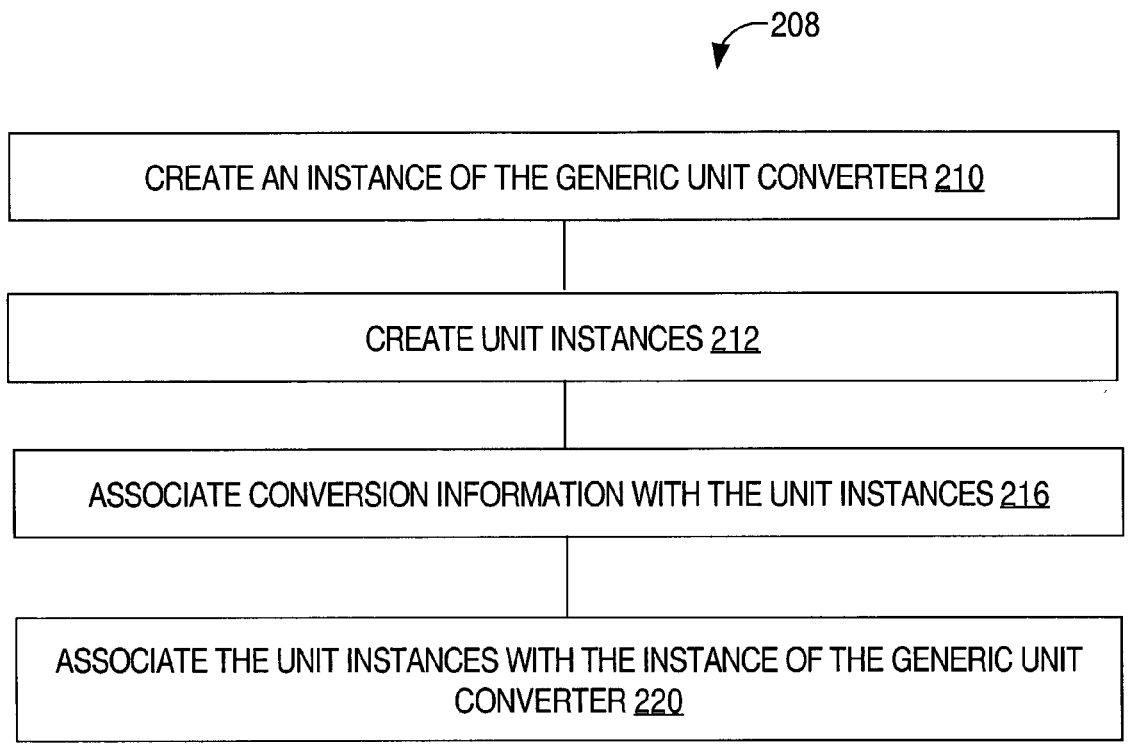

FIGS. 2A and 2B are flowcharts illustrating the operational flow for dynamically configuring the generic unit converter, in accordance with one embodiment of the present invention. For the purposes of explanation, FIGS. 2A and 2B are described with reference to the structures depicted in FIGS. 1A, 1B, 1C and 1D. However, other structures may be used besides those depicted in FIG. 1A. For example, a parser maybe used instead of the configuring mechanism 190, as will be described herein. The discussion of this operational flow assumes that the generic unit converter 163 is the measurable_quantity class 168. Furthermore, the discussion of this operational flow assumes that generic unit converter 163 will be dynamically configured to produce the length unit converter 180A.

In step 200, the process of dynamically configuring the generic unit converter 163 to produce the length unit converter 180B begins.

In step 204, the configuring mechanism 190 accesses a non-executable data structure, such as the metadata 110. The configuring mechanism 190 uses the XML tags in the metadata 110 to analyze the information in the metadata 110 and to determine the measurable quantities, the units, and the conversion information. For example, the configuring mechanism 190 uses the measurable_quantity begin tag (reference number 111) and the measurable_quantity end tag (reference number 128) to determine that the information (reference numbers 111 through 128) between these tags corresponds to a measurable quantity. In further analyzing the information associated with the measurable_quantity (reference numbers 111 and 128), the configuring mechanism 190 determines that this measurable_quantity is of type length (reference number 112), comprises three units— meter (reference numbers 113 through 117), foot (reference numbers 118 through 122), and millimeter (reference numbers 123 through 127), and each unit comprises conversion information (reference numbers 115, 116, 120, 121, 125, 126). Refer to the discussion under "The Metadata" section, for more information on the tags and how the tags are used to describe the information in the metadata 110.

In step 208, the generic unit converter 163 is dynamically configured at run time. The measurable quantities, the units, and the conversion information in the metadata 110 are used to dynamically configure the measurable_quantity class 168. The measurable_quantity class 168 is dynamically configured, for example, when the length instance 183 of the measurable_quantity class 168 is created, unit instances (185, 186, 187) of the unit class 164 are created, conversion information (reference numbers 115, 116, 120, 121, 125, 126) from the metadata 110 is associated with the unit instances (185, 186, 187), and the unit instances (185, 186, 187) are associated with the length instance 183. FIG. 2B shows in greater detail the steps that are carried out in step 208.

In step 210, an instance of the generic unit converter 163 is created. For example, when the configuring mechanism 190 encounters the measurable_quantity begin tag, at reference number 111, in metadata 110, the configuring mechanism 190 creates the length instance 183 of the measurable quantity class 168.

In step 212, unit instances are created. For example, when the configuring mechanism 190 encounters the unit begin tags (reference numbers 113, 118, 123), the configuring mechanism 190 creates the unit instances (185, 186, 187) of the unit class 164.

In step 216, the conversion information is associated with the unit instances. For example, the configuring mechanism 190 populates data attributes 182A of the unit instances (185, 186, 187) with the conversion information (reference numbers 115, 116, 120, 121, 125, 126) from the metadata 110. In continuing the example, the conversion information (reference numbers 115 and 116) for the meter unit has a value of 1.0 for the gain and a value of 0.0 for the offset. Therefore, the data attributes 182A, my_gain_and my_offset, in the meter instance 186 are populated with the values 1.0 and 0.0 respectively. Similar processing is used to populate the data attributes 182A with their respective conversion information (reference numbers 120, 121, 125, 126) for the foot instance 185 and the millimeter instance 187.

In step 220, the unit instances (185, 186, 187) are associated with the instance of the generic unit converter 163. Continuing the example, the unit instances (185, 186, 187) are associated with the length instance 183. According to one embodiment, the unit instances (185, 186, 187) are associated with the length instance 183, by initializing the list_of_units, as seen in the data attribute 181A, to reference the unit instances (185, 186, 187). The unit instances (185, 186, 187) may be, among other things, associated with the length instance 183 one at a time, all at once, or in sets.

In step 232, the process of dynamically configuring the generic unit converter 163 to produce the length unit converter 180B ends. In so doing, the configured unit converter(s) 180 comprises the length unit converter 180A, which allows a user 170 to perform unit conversions, from any unit in the length unit converter 180A to any other unit in the length unit converter 180A, by invoking the convert method 181C in the length instance 183, as will be described in more detail, via an application 150.

Similar processing, as what has been described in this section, may be used for dynamically configuring the generic unit converter 163 to produce the mass unit converter 180B.

Parsers

According to one embodiment, the configuring mechanism 190 comprises a parser and a callback routine. According to one embodiment, the parser is a Simple API for XML (SAX) parser and the callback routine is SAX parser handler associated with the SAX parser. The SAX parser reads the metadata 110 one line at a time and invokes the SAX parser handler when certain information, such as XML tags, is encountered in the metadata 110. The callback routine then takes certain action based on the XML tags, such as creating an instance of a particular class, and control then returns back to the parser for further processing.

According to another embodiment, the configuring mechanism 190 comprises a parser and an initializer. According to one embodiment, the parser is a Distributed Object Model (DOM) parser. The DOM parser reads all of the information in the metadata 110 and creates a tree that represents the information in the metadata 110. This tree is passed to the initializer. The initializer is used to create the instances in the configured unit converter(s) 180, based on the information in the tree, among other things. Since the tree comprises all the necessary information from the metadata 110 for dynamically configuring the generic unit converter 163, the initializer does not return control to the parser.

According to one embodiment, the configuring mechanism 190 comprises a Java API for XML Processing (JAXP) parser. Among other things, JAXP can be used for parsing XML documents and for transformations.

The Convert Method

FIG. 3 is a block diagram depicting the convert method. For the purposes of explanation, assume a user 170 wants to determine how many millimeters are in 100 feet. In this case, the convert method 181C in the length unit converter 180A would receive a source value (sourceVal) of 100, a source unit (sourceUnit) that indicates the sourceVal is in feet and a destination unit (destUnit) that indicates the user 170 wants millimeters. To satisfy the user's 170 request, the convert method 181C in the length unit converter 180A performs a conversion on the 100 feet and returns a value of 3048 millimeters, as will be described in this section.

According to one embodiment, the convert method 181C performs unit conversion by first converting the value of the source unit (sourceVal) to a value in the base unit (baseVal) and then converting the value in the base unit to a value in the destination unit (destUnit). In so doing, the convert method 181C performs the unit conversion in two operations (310, 320). For example, 100 feet are converted into x number of meters, which is the base unit, and then the x number of meters are converted into 3048 millimeters. Therefore, the first operation 310, converts the sourceVal to the value, baseVal, in the base unit for the associated measurable_quantity by subtracting the sourceUnit's offset, which in this example is 0.0 in foot instance 185, from the sourceVal, and by dividing the result of this computation by the sourceUnit's gain, which in this example is 3.28 in foot instance 185. In this example, the base unit associated with the length measurable_quantity is meters as can be seen in the data attributes 181A of the length instance 183. Furthermore, the second operation 320 completes the conversion to the destination unit by multiplying the baseVal by the destUnit's gain, which in this example is 1000.0 in millimeter instance 187, and by adding the destUnit's offset, which in this example is 0.0 in millimeter instance 187.

According to one embodiment, access methods, such as get_myOffset and get_myGain, are used to obtain values for my_gain and my_offset from the foot instance 185 and the millimeter instance 187.

According to one embodiment, the base unit is not verified in the convert method 181C. This is the embodiment depicted in FIG. 3. According to another embodiment, the convert method provides base unit verification. For example, the base_unit in data attributes 181A of the length instance 183 maybe used to verify that the baseVal should be in meters.

Dynamically Reconfiguring The Generic Unit Converter

According to one embodiment, the generic unit converter 163 may be dynamically reconfigured. One technique for dynamically reconfiguring the generic unit converter 163 involves entering new information into the metadata 110, deallocating the configured unit converter(s) 180, which is comprised of the instances from the measurable_quantity class 168 and the unit class 164, and redriving the creation of the configured unit converter(s) 180. In so doing, the newly created configured unit converter(s) 180 will contain the new information that was entered into the metadata 110 resulting in dynamically reconfiguring the generic unit converter 163.

For example, assume that metadata 110 initially only contained the length measurable quantity, the foot unit, the meter unit, and the millimeter unit (reference numbers 111 through 128). In this case, the configured unit converter(s) 180 would include four instances—the length instance 183, the foot instance 185, the meter instance 186, and the millimeter instance 187. Then assume there is a desire to add the mass measurable_quantity along with the kilogram unit and the pound unit. By deallocating the instances (183, 185, 186, 187) currently associated with the configured unit converter(s) 180, entering the metadata (reference numbers 129 through 141) for mass, kilogram, and pound, and redriving the creation of the configured unit converter(s) 180, seven instances (183, 185, 186, 187, 184, 188, 189) are created which reflect all of the information (reference numbers 111 through 141) in the metadata 110, as FIG. 2 depicts.

Unit Systems

According to one embodiment, unit systems, such as the US unit system (US), the Scientific International unit system (SI), the metric unit system, and the Canadian metric unit system, are used to contain one or more measurable quantities. In so doing, a particular measurable quantity, such as length, may belong to more than one unit system, such as US and metric.

One technique for unit systems to contain one or more measurable quantities is to associate the measurable quantities with the unit systems and to associate the measurable quantities with the units. For example, the generic unit converter 160 may include a class for unit systems (referred to hereinafter as a "unit system class") and the configured unit converter(s) 180 may include instances of the unit system class for each of the unit systems specified by the metadata 110. Furthermore, the unit system class may have a data attribute for list_of_associations between measurable quantities and units. For example, the list_of_associations data attribute of a US instance of the unit system class may be populated with length_to_foot and mass_to_pound. To continue this example, the list_of_associations data attribute of an SI instance of the unit system class may be populated with length_to_meter, mass_to_kilograms, and length_to_millimeter.

Named Object Class

According to one embodiment, it may be desirable for the name of an instance, such as foot, to be different from the displayed name, such as ft, used by an applet associated with application 150. One way of accomplishing this is to use a named object class, which correlates the name of the instance with the displayed name, as a super class for one or more of the classes in the generic unit converter and unit class 160. For example, if the named object class is a super class of the unit class 164, then the named object class portion of the foot instance 185 could have values for the name "foot" and the displayed name "ft". Furthermore, the information in the named object class portion of the unit instances may be used to list all of the possible displayed names, for a user's 170 selection, of any of the unit instances available to the applet.

Hardware Overview

Figure 4:
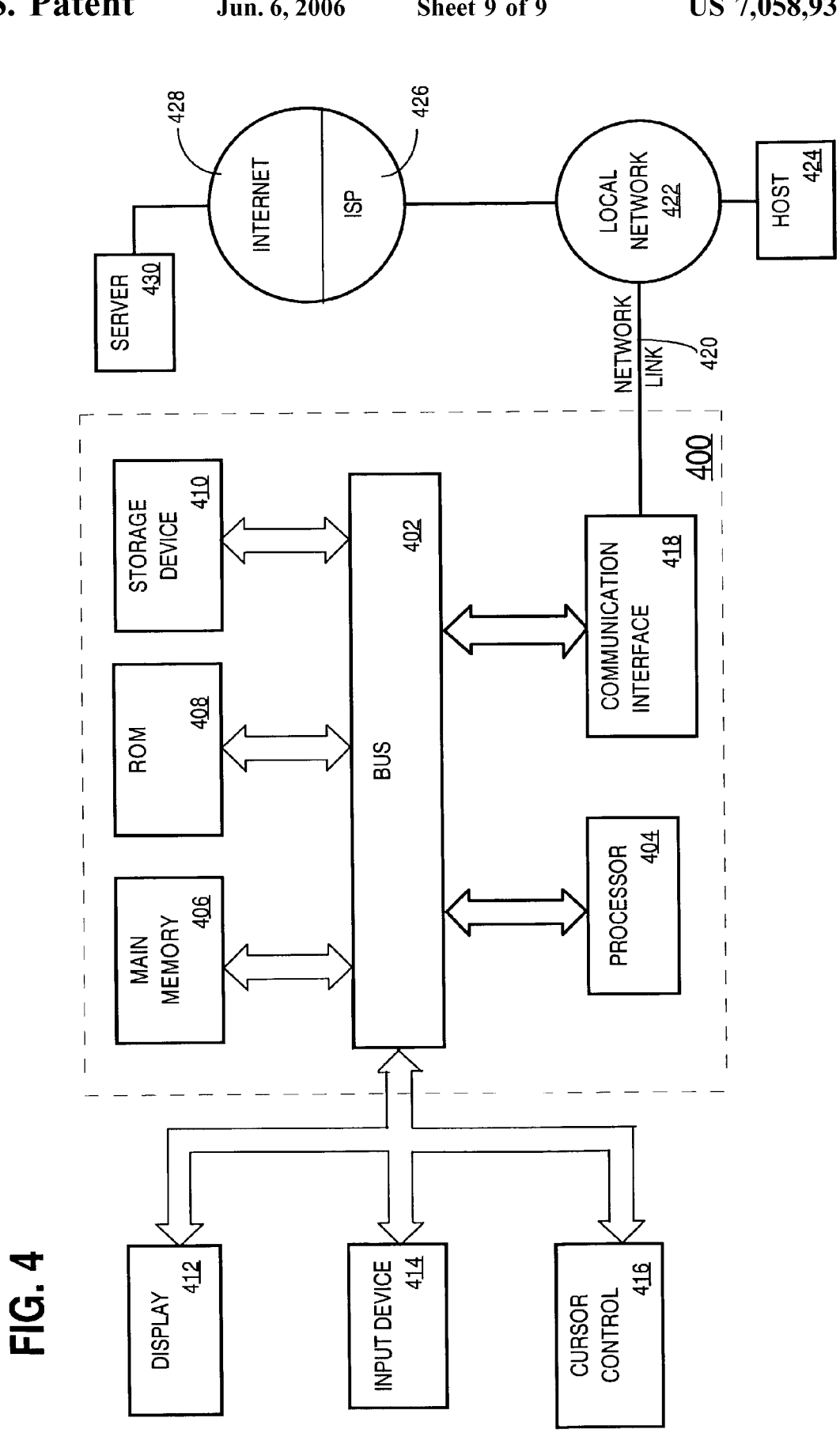
FIG. 4 is a block diagram of a computer system on which embodiments of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer implemented method for facilitating unit conversion, comprising:
   accessing a non-executable data structure, said data structure comprising an indication of at least one type of measurable quantity, and a set of parameters associated with said type of quantity, wherein said parameters comprise a plurality of units by which said type of quantity can be measured, and conversion information which specifies how one of said units may be converted to another one of said units; and
   dynamically configuring a generic unit converter at runtime in accordance with said parameters to enable said generic unit converter to convert any one of said units to any other one of said units for said type of quantity, wherein dynamically configuring said generic unit converter comprises:
      creating an instance of said generic unit converter; and
      associating said parameters with said instance.

2. The method of claim 1, wherein associating said parameters with said instance comprises:
   creating, for each of said units, a corresponding unit instance;
   associating, with each unit instance, at least a portion of said conversion information which specifies how the unit to which that unit instance corresponds may be converted to a base unit; and
   associating each unit instance with said instance of said generic unit converter.

3. The method of claim 2, wherein the portion of said conversion information which specifies how the unit to which a unit instance corresponds may be converted to a base unit comprises a multiplier and an offset.

4. The method of claim 1, wherein said generic unit converter comprises a set of compiled computer code, and wherein said generic unit converter is dynamically configured in accordance with said parameters without recompiling said generic unit converter.

5. The method of claim 1, wherein said generic unit converter comprises a set of compiled computer code, and wherein said generic unit converter may be dynamically configured in accordance with another set of parameters without recompiling said generic unit converter.

6. The method of claim 1, wherein said non-executable data structure comprises a text file which specifies a hierarchical structure.

7. The method of claim 1, wherein said non-executable data structure comprises an extensible markup language (XML) document.

8. The method of claim 1, further comprising:
   receiving, by said generic unit converter, a request to convert a first one of said units to a second one of said units;
   converting, by said generic unit converter, said first one of said units into a base unit using said conversion information; and
   converting, by said generic unit converter, said base unit into said second one of said units using said conversion information.

9. A computer storage medium carrying one or more sequences of instructions for facilitating unit conversion, wherein execution of the one or more sequences of instructions by one or more processors causes the one or more processors to perform:
   accessing a non-executable data structure, said data structure comprising an indication of at least one type of measurable quantity, and a set of parameters associated with said type of quantity, wherein said parameters comprise a plurality of units by which said type of quantity can be measured, and conversion information which specifies how one of said units may be converted to another one of said units; and
   dynamically configuring a generic unit converter at runtime in accordance with said parameters to enable said generic unit converter to convert any one of said units to any other one of said units for said type of quantity, wherein dynamically configuring said generic unit converter comprises instructions for performing;
   creating an instance of said generic unit converter; and
   associating said parameters with said instance.

10. The computer storage medium of claim 9, wherein associating said parameters with said instance comprises instructions for performing:
   creating, for each of said units, a corresponding unit instance;
   associating, with each unit instance, at least a portion of said conversion information which specifies how the unit to which that unit instance corresponds may be converted to a base unit; and
   associating each unit instance with said instance of said generic unit converter.

11. The computer storage medium of claim 10, wherein the portion of said conversion information which specifies how the unit to which a unit instance corresponds may be converted to a base unit comprises a multiplier and an offset.

12. The computer storage medium of claim 9, wherein said generic unit converter comprises a set of compiled computer code, and wherein said generic unit converter is dynamically configured in accordance with said parameters without recompiling said generic unit converter.

13. The computer storage medium of claim 9, wherein said generic unit converter comprises a set of compiled computer code, and wherein said generic unit converter may be dynamically configured in accordance with another set of parameters without recompiling said generic unit converter.

14. The computer storage medium of claim 9, wherein said non-executable data structure comprises a text file which specifies a hierarchical structure.

15. The computer storage medium of claim 9, wherein said non-executable data structure comprises an extensible markup language (XML) document.

16. The computer storage medium of claim 9, further comprising instructions for performing:
  receiving, by said generic unit converter, a request to convert a first one of said units to a second one of said units;
  converting, by said generic unit converter, said first one of said units into a base unit using said conversion information; and
  converting, by said generic unit converter, said base unit into said second one of said units using said conversion information.

17. An apparatus for facilitating unit conversion, comprising:
  a mechanism for accessing a non-executable data structure, said data structure comprising an indication of at least one type of measurable quantity, and a set of parameters associated with said type of quantity, wherein said parameters comprise a plurality of units by which said type of quantity can be measured, and conversion information which specifies how one of said units may be converted to another one of said units; and
  a mechanism for dynamically configuring a generic unit converter at runtime in accordance with said parameters to enable said generic unit converter to convert any one of said units to any other one of said units for said type of quantity,
  wherein the mechanism for dynamically configuring said generic unit converter comprises:
    a mechanism for creating an instance of said generic unit converter; and
    a mechanism for associating said parameters with said instance.

18. The apparatus of claim 17, wherein the mechanism for associating said parameters with said instance comprises:
  a mechanism for creating, for each of said units, a corresponding unit instance;
  a mechanism for associating, with each unit instance, at least a portion of said conversion information which specifies how the unit to which that unit instance corresponds may be converted to a base unit; and
  a mechanism for associating each unit instance with said instance of said generic unit converter.

19. The apparatus of claim 18, wherein the portion of said conversion information which specifies how the unit to which a unit instance corresponds may be converted to a base unit comprises a multiplier and an offset.

20. The apparatus of claim 17, wherein said generic unit converter comprises a set of compiled computer code, and wherein said generic unit converter is dynamically configured in accordance with said parameters without recompiling said generic unit converter.

21. The apparatus of claim 17, wherein said generic unit converter comprises a set of compiled computer code, and wherein said generic unit converter may be dynamically, configured in accordance with another set of parameters without recompiling said generic unit converter.

22. The apparatus of claim 17, wherein said non-executable data structure comprises a text file which specifies a hierarchical structure.

23. The apparatus of claim 17, wherein said non-executable data structure comprises an extensible markup language (XML) document.

24. The apparatus of claim 17, further comprising:
  a mechanism for receiving, by said generic unit converter, a request to convert a first one of said units to a second one of said units;
  a mechanism for converting, by said generic unit converter, said first one of said units into a base unit using said conversion information; and
  a mechanism for converting, by said generic unit converter, said base unit into said second one of said units using said conversion information.

25. The method according to claim 9, wherein said generic unit converter is a first unit converter, wherein said type of quantity is a first type of quantity, and the method further comprises:
  dynamically configuring a second generic unit converter at runtime in accordance with said parameters to enable said second generic unit converter to convert any one of a set of units to any other one of said set of units for a second type of quantity,
  wherein said parameters comprises the set of units by which said second type of quantity can be measured, and
  wherein said first type of quantity is different than said second type of quantity.

26. The computer storage medium according to claim 9, wherein said generic unit converter is a first unit converter, wherein said type of quantity is a first type of quantity, and wherein execution of the one or more sequences of instructions by the one or more processors causes the one or more processors to further perform:
  dynamically configuring a second generic unit converter at runtime in accordance with said parameters to enable said second generic unit converter to convert any one of a set of units to any other one of said set of units for a second type of quantity,
  wherein said parameters comprises the set of units by which said second type of quantity can be measured, and
  wherein said first type of quantity is different than said second type of quantity.

27. The apparatus according to claim 17, wherein said generic unit converter is a first unit converter, wherein said type of quantity is a first type of quantity, and the apparatus further comprises:
  an apparatus for dynamically configuring a second generic unit converter at runtime in accordance with said parameters to enable said second generic unit converter to convert any one of a set of units to any other one of said set of units for a second type of quantity,
  wherein said parameters comprises the set of units by which said second type of quantity can be measured, and
  wherein said first type of quantity is different than said second type of quantity.

* * * * *

UNITED STATES PATENT AND TRADEMARK OFFICE
CERTIFICATE OF CORRECTION

PATENT NO. : 7,058,931 B2 Page 1 of 1
APPLICATION NO. : 10/267945
DATED : June 6, 2006
INVENTOR(S) : Vinay S. Pai It is certified that error appears in the above-identified patent and that said Letters Patent is hereby corrected as shown below:

Column 13
Claim 21: Line 62, delete "dynamically," and insert --dynamically--.

Signed and Sealed this

Fifteenth Day of August, 2006

JON W. DUDAS
*Director of the United States Patent and Trademark Office*